(12) United States Patent
Kasamatsu et al.

(10) Patent No.: US 7,253,774 B2
(45) Date of Patent: Aug. 7, 2007

(54) COLLAPSIBLE ANTENNA DEVICE

(75) Inventors: Hideki Kasamatsu, Osaka (JP); Hiroshi Nakashima, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/559,274

(22) PCT Filed: May 28, 2004

(86) PCT No.: PCT/JP2004/007805

§ 371 (c)(1),
(2), (4) Date: Dec. 2, 2005

(87) PCT Pub. No.: WO2004/109849

PCT Pub. Date: Dec. 16, 2004

(65) Prior Publication Data

US 2006/0125699 A1     Jun. 15, 2006

(30) Foreign Application Priority Data

Jun. 3, 2003   (JP) .............................. 2003-157830
Jun. 3, 2003   (JP) .............................. 2003-157831

(51) Int. Cl.
*H01Q 1/24* (2006.01)
(52) U.S. Cl. ...................... 343/702; 343/882
(58) Field of Classification Search ................ 343/702, 343/700 MS, 895, 725, 880, 881, 882; 455/90.1, 455/575.1
See application file for complete search history.

(56) References Cited

U.S. PATENT DOCUMENTS 5,394,297 A  *  2/1995  Toedter ...................... 361/683
5,681,176 A  *  10/1997  Ibaraki et al. ............... 439/165
6,025,816 A  *  2/2000  Dent et al. ................... 343/895
6,754,507 B2 *  6/2004  Takagi ...................... 455/550.1
6,873,520 B2    3/2005  Takagi et al.
6,941,117 B2 *  9/2005  Ide ............................ 455/90.1

FOREIGN PATENT DOCUMENTS

| JP | 5-33581 | 4/1993 |
|----|---------|--------|
| JP | 09-153931 | 6/1997 |
| JP | 9-246824 | 9/1997 |
| JP | 2001-243435 | 9/2001 |
| JP | 2002-64328 | 2/2002 |
| JP | 2002-237773 | 8/2002 |
| JP | 2002-271125 | 9/2002 |
| JP | 2002-335314 | 11/2002 |
| JP | 2003-46275 | 2/2003 |
| WO | WO04/109849 | 12/2004 |

OTHER PUBLICATIONS

Japanese Office Action dated Apr. 25, 2006.

* cited by examiner

*Primary Examiner*—Tho Phan
(74) *Attorney, Agent, or Firm*—Westerman, Hattori, Daniels & Adrian, LLP.

(57) ABSTRACT

In an antenna device of the present invention, an upper cabinet 2 is pivotally supported on a lower cabinet 4 through a hinge mechanism 3, the lower cabinet 4 containing a radio module 41, the upper cabinet 2 having a plurality of antennas 21 disposed therein. The hinge mechanism 3 includes a cylindrical shaft member 31 openably and closably connecting the two cabinets 2, 4 to each other, an outer peripheral surface of the shaft member 31 having a plurality of groove portions 32 formed at axially spaced intervals. A plurality of cables 22 are wound around the outer peripheral surface of the shaft member 31 while being respectively fitted in the plurality of groove portions 32.

8 Claims, 11 Drawing Sheets

COLLAPSIBLE ANTENNA DEVICE

This application is a 371 of PCT/JP04/07805, filed on May 28, 2004.

TECHNICAL FIELD

The present invention relates to an antenna device that receives radio waves by a diversity method.

BACKGROUND ART

Diversity method antenna devices have been conventionally known that have a plurality of antennas with different reception characteristics and directivities, and select therefrom an antenna in the best communication condition to receive radio waves (see JP 2002-237773, A and JP 2002-271125, A, for example).

In the diversity method antenna devices, the plurality of antennas are connected to a radio module through coaxial cables, and one or more of the antennas in good communication conditions are selected by the radio module. Therefore, good communication condition can be obtained even in the case where reception radio waves vary in arrival direction with surrounding environments or the case where reflected waves or diffracted waves of the radio waves are received.

Figure 18:
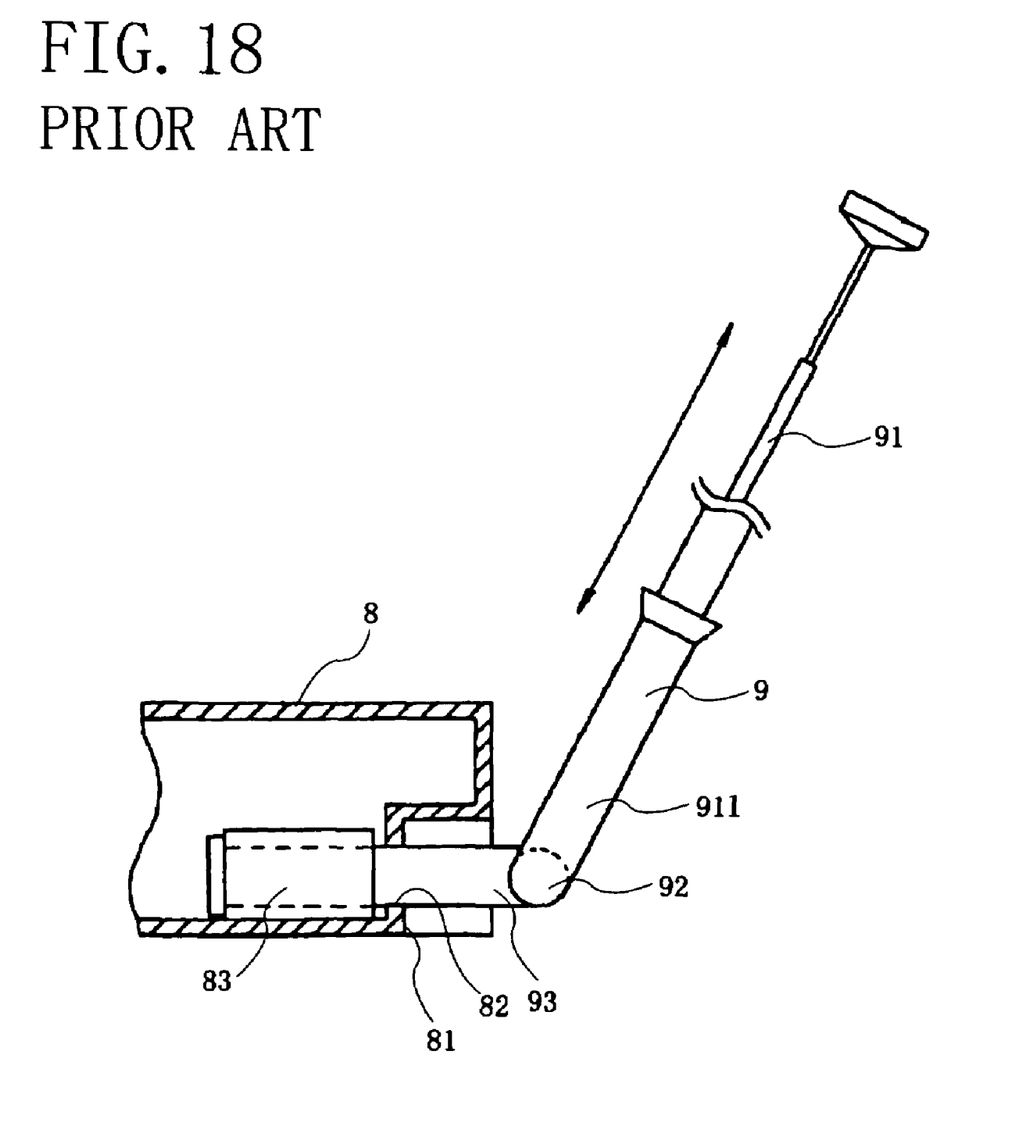
FIG. 18 is a partially broken side view of a conventional antenna device.

An antenna device has been known in which an antenna is containably attached to a case and the antenna can be taken in and out of the case if necessary (see JP 9-246824, A). As shown in FIG. 18, the antenna device includes a telescopic antenna 9 slidably projecting from an end of a case 8. A recess 81 is defined at the end of the case 8, and an opening 82 is defined at a bottom of the recess 81. Inside the case 8, a cylindrical antenna holder 83 is attached facing to the opening 82. The antenna 9 has a first rod 91 having the largest diameter among a plurality of telescopic rod portions 91, the first rod 91 coupled to an antenna base 93 through a hinge mechanism 92. The antenna base 93 is slidably held by the antenna holder 83, and can rotate on the sliding direction.

In the antenna device, if radio waves need not be transmitted nor received, the antenna 9 is contained inside the case 8. If radio waves need be transmitted or received, the whole antenna 9 is first exposed from the case 8, the rod portion 91 is subsequently rotated on a rotation axis of the hinge mechanism 92, and the rod portion 91 is thereafter extended. This enables the antenna 9 to transmit and receive radio waves. In this state, the antenna 9 can be rotated by the hinge mechanism 92 so as to be close to or apart from the case 8, while the antenna 9 can rotate on a central axis thereof to vary directions of the rotation axis of the hinge mechanism 92. The antenna 9 can be thereby directed in a direction of the highest reception sensitivity to thereby obtain a good communication condition.

However, if a diversity method antenna device is attached for use to for example a cabinet of a television receiver, the antenna device will be attached in a position projecting from the cabinet in order for a plurality of antennas to be in good radio wave reception conditions. Therefore, there has been a problem of obstruction as the antenna device always projects from the cabinet even if radio waves need not be transmitted nor received.

Accordingly, a collapsible antenna device may be possible in which a pair of cases are openably and closably connected through a hinge mechanism similar to the hinge mechanism provided in the antenna device of FIG. 18, and one case contains a plurality of antennas, while the other case contains a radio module, the other case being fixed to a cabinet. In the antenna device, the antennas can be set to project from the cabinet by opening the both cases when radio waves are transmitted or received, and the antennas can be collapsed by closing the both cases when radio waves need not be transmitted nor received.

However, in the antenna device as described above, a plurality of cables for connecting the plurality of antennas to the radio module pass through the hinge mechanism, and therefore the plurality of cables are likely to be entangled with each other by rotation operation of the hinge mechanism accompanying opening and closing operation of the both cases to thereby cause troubles in rotation operation of the both cases.

Accordingly, an object of the present invention is to provide an antenna device capable of being collapsed if necessary, in which a plurality of cables extending between a plurality of antennas and a radio module are not entangled with each other with collapsing.

DISCLOSURE OF THE INVENTION

In a first antenna device of the present invention, a plurality of antennas 21 are connected to a radio module 41 through respective cables, and one or more of the antennas 21 in good communication conditions can be selected by the radio module 41. A movable case is pivotally supported on a base case through a hinge mechanism 3, and the radio module 41 is contained in the base case, while the plurality of antennas 21 are disposed in the movable case. The hinge mechanism 3 includes a cylindrical shaft member 31 openably and closably connecting the base case and the movable case to each other. An outer peripheral surface of the shaft member 31 has a plurality of circumferentially extending groove portions 32 provided at axially spaced intervals. The plurality of cables extending between the plurality of antennas 21 and the radio module 41 are wound around the outer peripheral surface of the shaft member 31 while being respectively fitted in the plurality of groove portions 32 of the shaft member 31.

In the above-described antenna device of the present invention, the base case may be, for example, a part of a cabinet of a television receiver, or may be a separate cabinet fixed to the cabinet of the television receiver. Here, since the both cases are openably and closably connected by the hinge mechanism 3, the movable case is opened relative to the base case with the base case fixed to thereby enable the plurality of antennas 21 disposed in the movable case to be placed at a higher position than the base case. The movable case is also closed relative to the base case to thereby enable the plurality of antennas 21 to be set so as to be flush with the base case.

In the above-described antenna device of the present invention, since the groove portions 32 of the shaft member 31 are provided at mutually spaced intervals, the plurality of cables are tidily arranged on the outer peripheral surface of the shaft member 31 at mutually spaced intervals while being fitted in the groove portions 32. The both cases can be opened and closed with the cables fitted in the respective groove portions 32 of the shaft member 31, and therefore the cables are not disengaged from the respective groove portions 32 of the shaft member 31 at the time of rotation operation of the hinge mechanism 3, maintaining a spaced apart position relationship to each other. Therefore, the plurality of cables are not entangled with each other with opening and closing operation of the both cases.

In a specific construction, a single spirally extending groove 33 is provided on the outer peripheral surface of the shaft member 31, and the groove 33 defines the plurality of groove portions 32. Each of the cables is wound around the groove 33 over an angle range of 360 degrees or more. In the specific construction, since the plurality of groove portions 32 are defined by the single spirally extending groove 33, the plurality of groove portions 32 also extend spirally. Therefore, each of the cables does not overlap itself, nor do neighboring cables contact each other even if each of the cables is wound around each of the groove portions 32 over an angle range of 360 degrees or more.

The plurality of cables are wound around the shaft member 31 over an angle range of 360 degrees or more to thereby always keep each of the cables wound around the shaft member 31 whether the both cases are opened or closed. Therefore, the cables are not disengaged from the groove portions 32 of the shaft member 31 with opening and closing operation of the both cases, maintaining a spaced apart position relationship to each other.

In a further specific construction, the plurality of groove portions 32 represent V-shapes in a cross section including a central axis of the shaft member 31. In the specific construction, the groove portions 32 have a pair of slopes, a space between which narrows toward a bottom thereof from a surface of the shaft member 31. Therefore, even if the cables float from the bottom of the groove portions 32 with opening and closing operation of the both cases, the cables will be guided by the slopes to return to original positions of the bottom. Therefore, even if the cables are slightly slack, the cables are not disengaged from the groove portions 32.

In a second antenna device of the present invention, a plurality of antennas 21 are connected to a radio module 41 through respective cables, and one or more of the antennas 21 in good communication conditions can be selected by the radio module 41. A movable case is pivotally supported on a base case through a hinge mechanism 3, and the radio module 41 is contained in the base case, while the plurality of antennas 21 are disposed in the movable case. The hinge mechanism 3 includes a cylindrical shaft member 24 openably and closably connecting the base case and the movable case to each other. The base case has disposed thereon a guide surface 40 opposed to an outer peripheral surface of the shaft member 24. The plurality of cables extending between the plurality of antennas 21 and the radio module 41 are held at mutually spaced intervals between the outer peripheral surface of the shaft member 24 and the guide surface 40.

In the above-described antenna device of the present invention, the base case may be, for example, a part of a cabinet of a television receiver, or may be a separate cabinet fixed to the cabinet of the television receiver. Here, since the both cases are openably and closably connected by the hinge mechanism 3, the movable case is opened relative to the base case with the base case fixed to thereby enable the plurality of antennas 21 disposed in the movable case to be placed at a higher position than the base case. The movable case is also closed relative to the base case to thereby enable the plurality of antennas 21 to be set to be flush with the base case.

In the above-described antenna device of the present invention, the plurality of cables are held at mutually spaced intervals between the outer peripheral surface of the shaft member 24 and the guide surface 40, and the holding state is kept also at the time of opening and closing operation of the both cases. That is, the both cases can be opened and closed with each of the cables held by the outer peripheral surface of the shaft member 24 and the guide surface 40. Therefore, each of the cables does not shift in a direction of a rotation axis of the hinge mechanism 3 with rotation operation of the hinge mechanism 3, maintaining a spaced apart position relationship to each other. Therefore, the plurality of cables are not entangled with each other with opening and closing operation of the both cases.

In a specific construction, the base case has rotatably disposed thereon a cylindrical guide member 43 extending in parallel with the shaft member 24. The guide surface 40 is defined by an outer peripheral surface of the guide member 43. In the specific construction, when the plurality of cables are moved in a cable longitudinal direction with opening and closing operation of the both cases, since the guide surface 40 for holding each of the cables with the outer peripheral surface of the shaft member 24 is defined by the outer peripheral surface of the rotatable cylindrical guide member 43, the guide member 43 rotates as the plurality of cables move to prevent friction from occurring between these cables and the guide surface 40. Therefore, the plurality of cables are moved smoothly with opening and closing operation of the both cases to prevent troubles from being caused.

In a further specific construction, the guide surface 40 is provided with a plurality of groove portions 49 extending along the plurality of cables. The plurality of cables are respectively fitted in the plurality of groove portions 49. Alternatively, the outer peripheral surface of the shaft member 24 has a plurality of circumferentially extending winding grooves 25 provided at axially spaced intervals. The plurality of cables are respectively fitted in the plurality of winding grooves 25. In the specific construction, the groove portions 49 of the guide surface 40 and the winding grooves 25 of the shaft member 24 are provided at intervals spaced axially of the guide member 43 and the shaft member 24. Therefore, the plurality of cables are tidily arranged at mutually spaced intervals by being fitted in one or both of the groove portions 49 and winding grooves 25. The plurality of cables are thereby held between the guide surface 40 and the outer peripheral surface of the shaft member 24 while being tidily arranged, and the both cases can be opened and closed in this state. Therefore, the cables are not disengaged from the respective groove portions 49 of the guide surface 40 or winding grooves 25 of the shaft member 24 with rotation operation of the hinge mechanism 3, maintaining a spaced apart position relationship to each other.

The plurality of cables are held between the outer peripheral surface of the shaft member 24 and the guide surface 40 while being fitted in the groove portions 49 of the guide surface 40 or winding grooves 25 of the shaft member 24. This enables a space between the outer peripheral surface of the shaft member 24 and the guide surface 40 to be smaller than a diameter of the cables. The cables will be thereby restrained in an inside of one or both of the respective groove portions 49 and winding grooves 25, and therefore unable to escape from those grooves. Consequently, the plurality of cables are always kept tidily arranged while being fitted in one or both of the groove portions 49 and winding grooves 25. Furthermore, the shaft member 24 and the guide surface 40 can be arranged close to each other, thereby realizing small-sized antenna devices.

As described above, according to the collapsible antenna device of the present invention, the plurality of cables are not entangled with each other with collapsing.

BEST MODE FOR CARRYING OUT THE INVENTION

Embodiments of the present invention carried out to an antenna device of a television receiver will be specifically described below with reference to the drawings.

First Antenna Device

Figure 1:
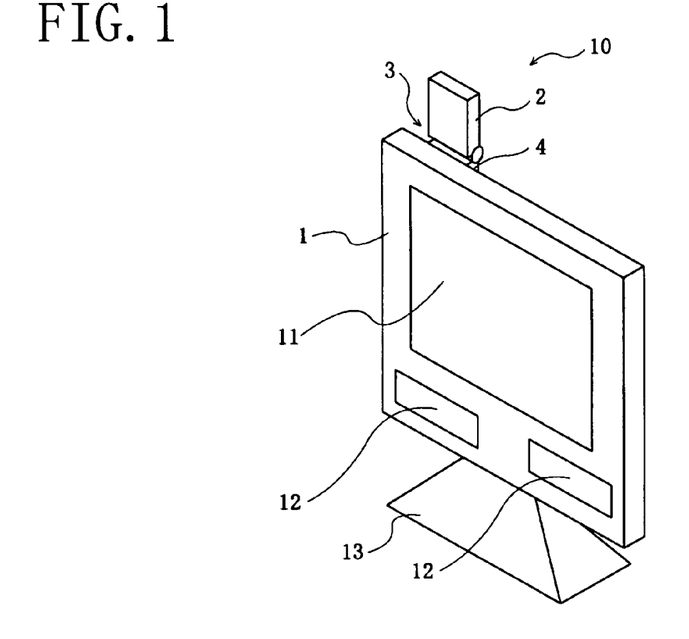
FIG. 1 is a perspective view showing an open state of a first antenna device of the present invention.

As shown in FIG. 1, a television receiver of the present example includes a flat main body 1, and the main body 1 is supported by a base 13. A flat display 11 is disposed on a surface of the main body 1, while a pair of speakers 12, 12 are disposed below the display 11. An antenna unit 10 for receiving television broadcast waves is also attached to a back surface of the main body 1.

The television receiver is connected by a wireless LAN with a television broadcast receiving device (not shown) installed indoors, and can output video and audio of television broadcasts from the display 11 and the speakers 12, 12 by receiving television broadcast waves transmitted from the television broadcast receiving device by the antenna unit 10.

Figure 2:
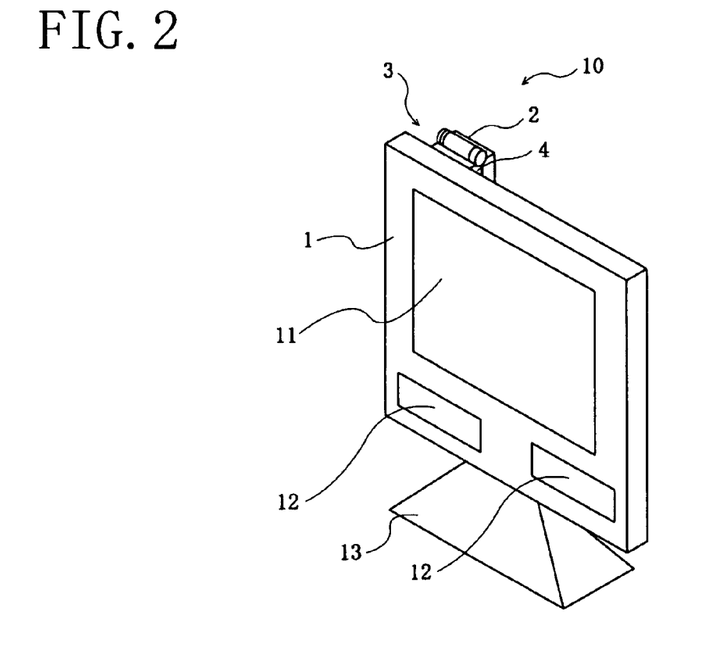
FIG. 2 is a perspective view showing a closed state of the antenna device.

As shown in FIG. 1 and FIG. 2, the antenna unit 10 includes an upper cabinet 2 and a lower cabinet 4 each in the form of rectangular parallelepiped, and the both cabinets 2, 4 are coupled to each other by a hinge mechanism 3. The upper cabinet 2 is thereby openably and closably supported on the lower cabinet 4. A user can open the upper cabinet 2 relative to the lower cabinet 4 as shown in FIG. 1, or close the upper cabinet 2 relative to the lower cabinet 4 as shown in FIG. 2. As shown in FIG. 1, the antenna unit 10 is attached with the lower cabinet 4 fixed to the back surface of the main body 1 of the television receiver, so that the whole upper cabinet 2 projects from an upper surface of the main body 1 in an open state in FIG. 1, and the whole upper cabinet 2 hides behind the main body 1 in a closed state in FIG. 2.

Figure 3:
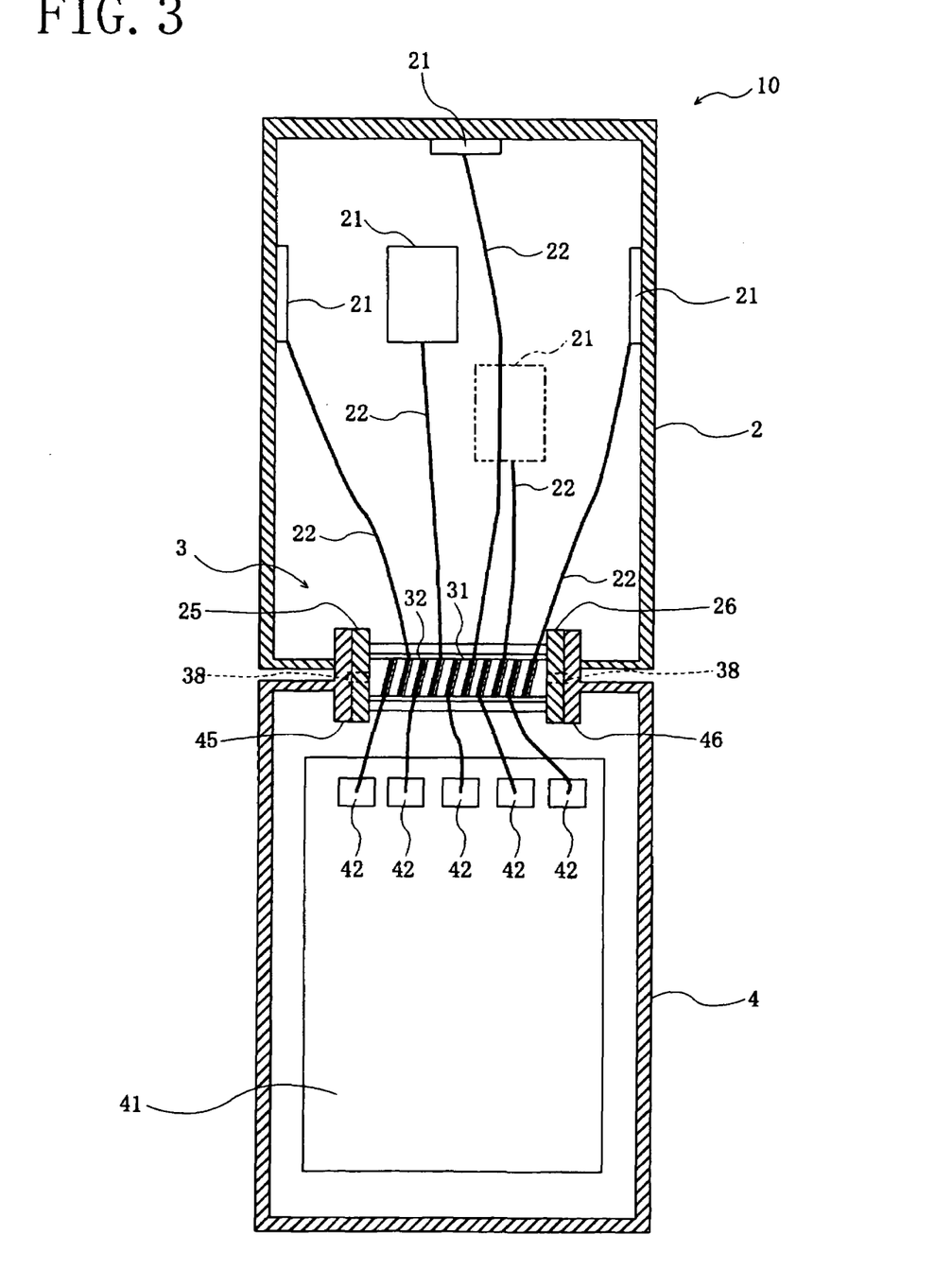
FIG. 3 is a sectional view of the antenna unit.
Figure 4:
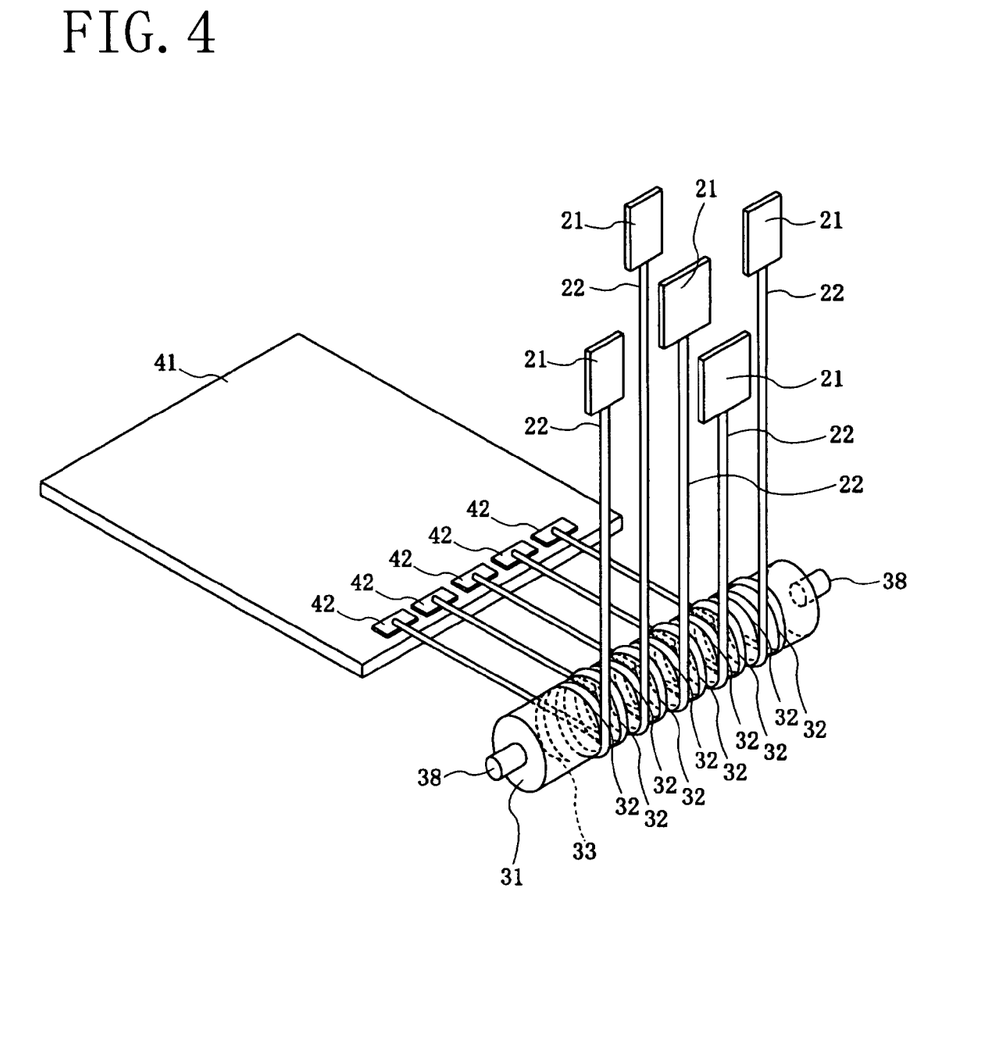
FIG. 4 is a perspective view showing an internal construction of the antenna unit.

As shown in FIG. 3 and FIG. 4, inside the upper cabinet 2, five flat antennas 21 with different reception characteristics and directivities are attached to five surfaces except a bottom surface. Coaxial cables 22 with excellent high-frequency characteristics are connected to the respective antennas 21.

The hinge mechanism 3 includes a cylindrical shaft member 31, and a pair of pivotal support pins 38, 38 for serving as a rotation axis of the hinge mechanism 3 project from both end surfaces of the shaft member 31. As shown in FIG. 3, a pair of left and right first and second ring-shaped pieces 25, 26 project from a lower end of the upper cabinet 2, and a pair of left and right first and second ring-shaped pieces 45, 46 project from an upper end of the lower cabinet 4.

The first ring-shaped piece 25 of the upper cabinet 2 and the first ring-shaped piece 45 of the lower cabinet 4 are coupled by one pivotal support pin 38 of the shaft member 31 so as to rotate relative to each other. The second ring-shaped piece 26 of the upper cabinet 2 and the second ring-shaped piece 46 of the lower cabinet 4 are also coupled by the other pivotal support pin 38 of the shaft member 31 so as to rotate relative to each other. The both cabinets 2, 4 will be thereby relatively rotated on the pair of pivotal support pins 38, 38 of the hinge mechanism 3, and opened and closed.

Figure 5:
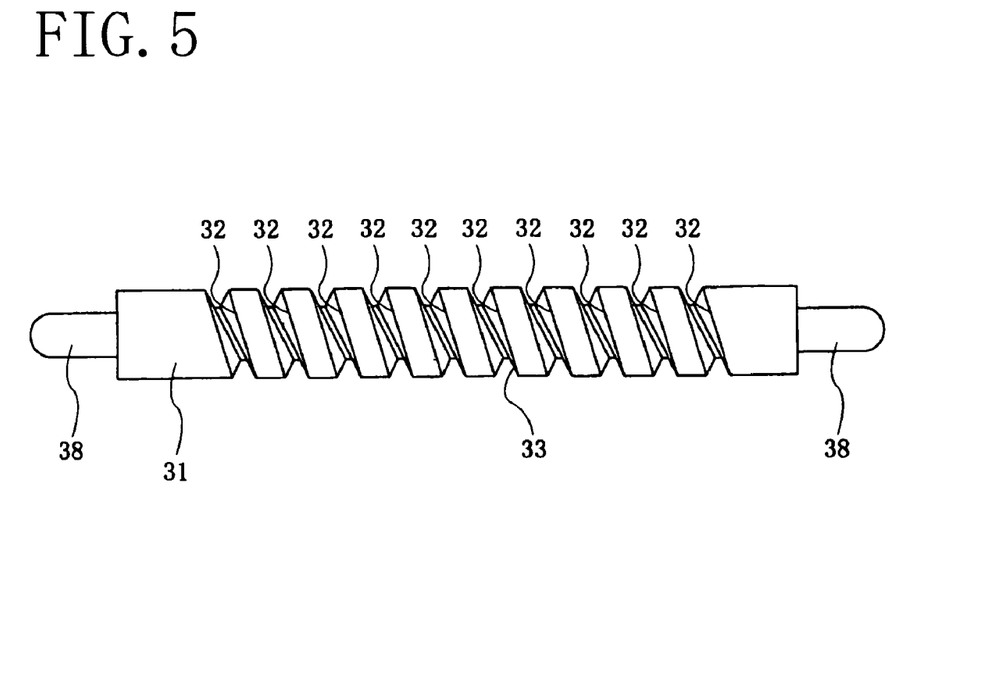
FIG. 5 is a front view of a shaft member.

As shown in FIG. 5, a single spirally extending V-shaped groove 33 is provided at a constant pitch on an outer peripheral surface of the shaft member 31, and the V-shaped groove 33 defines a plurality of groove portions 32 linking to each other.

Figure 6:
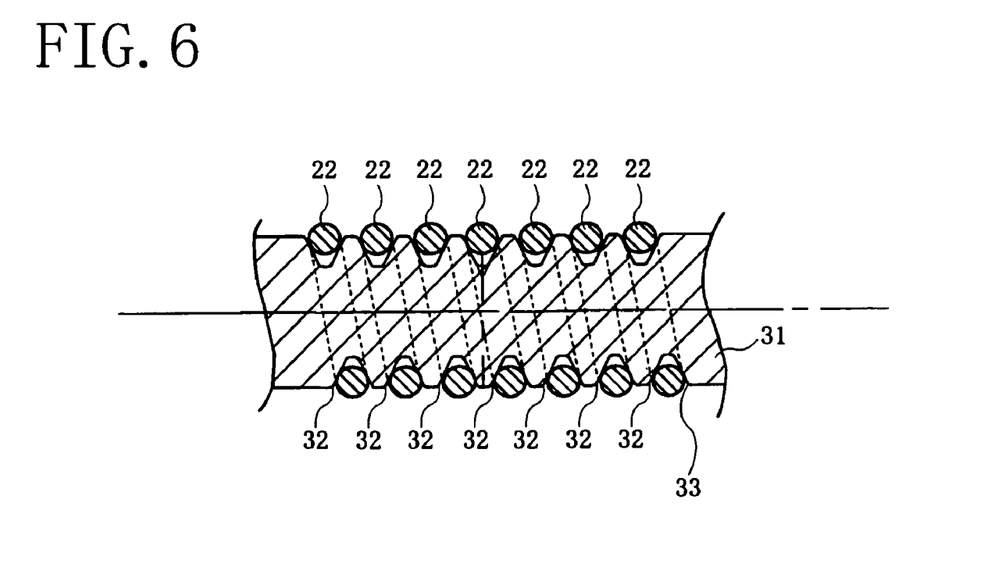
FIG. 6 is a sectional view showing the shaft member having coaxial cables wound therearound.

As shown in FIG. 4 and FIG. 6, each of the five coaxial cables 22 extending from the five antennas 21 is wound around each of the groove portions 32 of the V-shaped groove 33 of the shaft member 31, a winding angle thereof being approximately 360 degrees when the both cabinets 2, 4 are in the open state, and approximately 540 degrees when the both cabinets 2, 4 are in the closed state. The five coaxial cables 22 are wound around the shaft member 31 at regular intervals so as not to contact each other.

Thus, the five coaxial cables 22 are wound around the outer peripheral surface of the shaft member 31 while being fitted in the groove portions 32 of the shaft member 31, and therefore tidily arranged at mutually spaced regular intervals as shown in FIG. 4 to pass through the hinge mechanism 3 while keeping the regular intervals and extend toward the lower cabinet 4.

A radio module 41 is disposed inside the lower cabinet 4, and five terminal areas 42 are formed on an upper end of the radio module 41. Ends of the coaxial cables 22 are connected to the respective terminal areas 42. The five antennas 21 are thereby connected to the radio module 41 through the five coaxial cables 22.

In the above-described antenna device of the present invention, when television broadcast waves are received from the television broadcast receiving device, the upper cabinet 2 is opened as shown in FIG. 1. The upper cabinet 2 is thereby projected from the upper surface of the main body 1 of the television receiver to arrange the five antennas 21 shown in FIG. 3 at a higher position than the upper surface of the main body 1. In this state, one or more of the antennas 21 in good communication conditions are selected from the five antennas 21 by the radio module 41, and television broadcast waves from the television broadcast receiving device are received by the antennas 21. Consequently, the display 11 of the television receiver displays high-quality video, while the pair of speakers 12, 12 emit high-quality audio.

After television broadcast waves finish being received, the upper cabinet 2 is closed as shown in FIG. 2, and the upper cabinet 2 is contained behind the main body 1 of the television receiver. The upper cabinet 2 of the antenna unit 10 is thereby hidden at a position invisible from front to prevent the antenna unit 10 from becoming obstructive.

In the above-described antenna device of the present invention, the five coaxial cables 22 extending from the five antennas 21 to the radio module 41 are wound around the outer peripheral surface of the shaft member 31 while being fitted in the plurality of groove portions 32 of the shaft member 31, and the winding angle thereof covers a sufficient angle range exceeding 360 degrees. Therefore, even when the upper cabinet 2 is opened or closed, the coaxial cables 22 always remain fitted in the respective groove portions 32 with a sufficient angle range, and are unlikely to be disengaged from the respective groove portions 32.

Each of the groove portions 32 of the V-shaped groove 33 of the shaft member 31 has a pair of slopes, a space between which narrows toward a bottom thereof from a surface of the shaft member 31. Therefore, even if the coaxial cables 22 float from the bottom of the groove portions 32 and move to the outer peripheral surface of the shaft member 31 with opening and closing operation of the both cabinets 2, 4, the cables are guided by the slopes of the groove portions 32 to return to original positions of the bottom. Therefore, even if some slack occurs in the coaxial cables 22 to float the coaxial cables 22 from the bottom of the groove portions 32 while the upper cabinet 2 is being opened from the closed state, the coaxial cables 22 are again contained in the bottom of the groove portions 32 while the upper cabinet 2 is being closed. Thus, the coaxial cables 22 are always kept fitted in the respective groove portions 32, and not disengaged from the groove portions 32.

As described above, according to the antenna device of the present invention, the five coaxial cables 22 are always kept tidily arranged irrespective of the open or closed state of the upper cabinet 2, and always maintained to be tidily arranged also at the time of opening or closing operation of the upper cabinet 2. Therefore, the five coaxial cables 22 are not entangled with each other as the upper cabinet 2 is opened or closed, and therefore the five coaxial cables 22 are unlikely to cause troubles in opening and closing operation of the upper cabinet 2.

Second Antenna Device

FIRST EXAMPLE

A television receiver of the present example has a similar construction to the above-described example shown in FIG. 1 and FIG. 2, including an openable and closable antenna unit 10 attached to a back surface of a main body 1. An upper cabinet 2 and a lower cabinet 4 constituting the antenna unit 10 are openably and closably connected to each other by a hinge mechanism 3.

Figure 9:
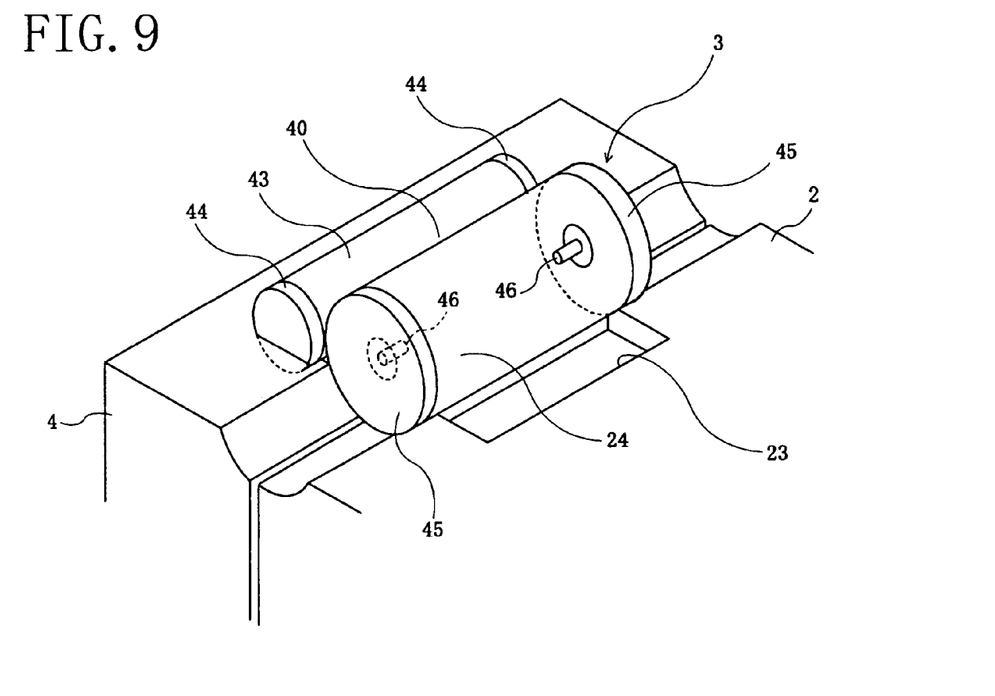
FIG. 9 is an enlarged perspective view showing a hinge mechanism and a guide member.

As shown in FIG. 9, the hinge mechanism 3 includes a pair of ring-shaped piece parts 45, 45 projecting from an upper end of the lower cabinet 4 and opposed to both end surfaces of a cylindrical shaft member 24 attached to a lower end of the upper cabinet 2, the shaft member 24 and the ring-shaped piece parts 45, 45 being coupled by a pair of first pivotal support pins 46, 46 so as to rotate relative to each other. The both cabinets 2, 4 will be thereby relatively rotated on the pair of first pivotal support pins 46, 46 of the hinge mechanism 3, and opened and closed. A slit 23 having a width approximately same as a distance between the both end surfaces of the shaft member 24 is also defined on a bottom surface of the upper cabinet 2 at a position to be opposed to an outer peripheral surface of the shaft member 24.

Figure 10:
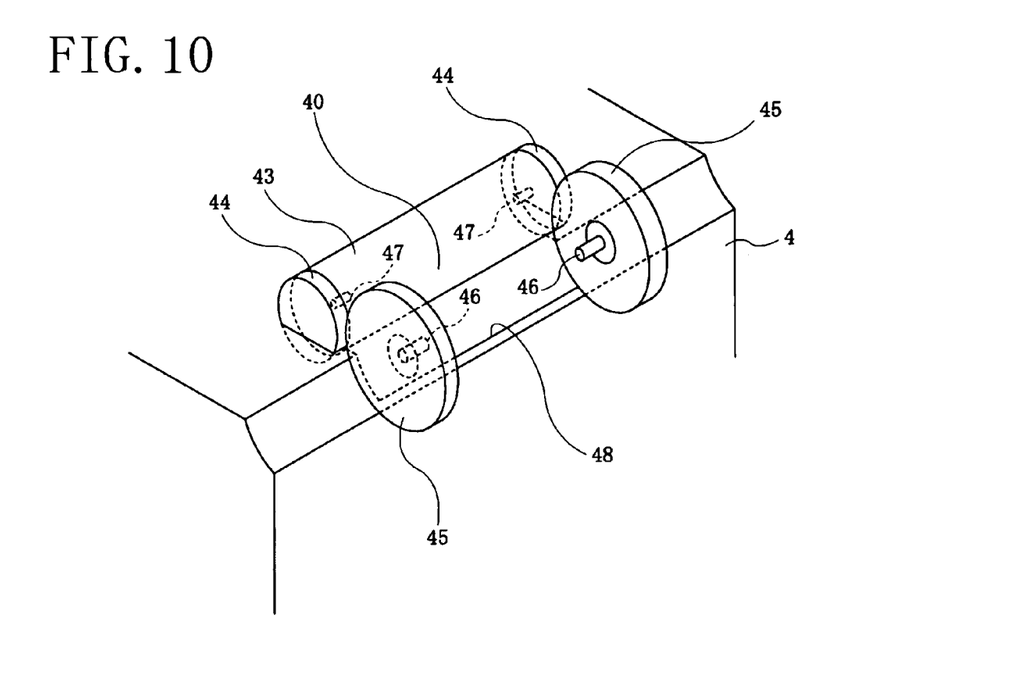
FIG. 10 is an enlarged perspective view showing the guide member.

As shown in FIG. 10, an opening 48 having a width approximately same as the distance between the both end surfaces of the shaft member 24 is defined on an upper surface of the lower cabinet 4 at a position opposed to the shaft member 31. A pair of circular piece parts 44, 44 project from both sides of the opening 48 at a position opposed to the pair of ring-shaped piece parts 45, 45. A cylindrical guide member 43 extending in parallel with the shaft member 24 is attached across the opening 44 between the circular piece parts 44, 44. The guide member 43 is rotatably attached to the circular piece parts 44, 44 through a pair of second pivotal support pins 47, 47 having a rotation axis parallel with a rotation axis of the hinge mechanism 3. The guide member 43 has defined by an outer peripheral surface thereof a guide surface 40 for guiding coaxial cables 22 described below.

Figure 11:
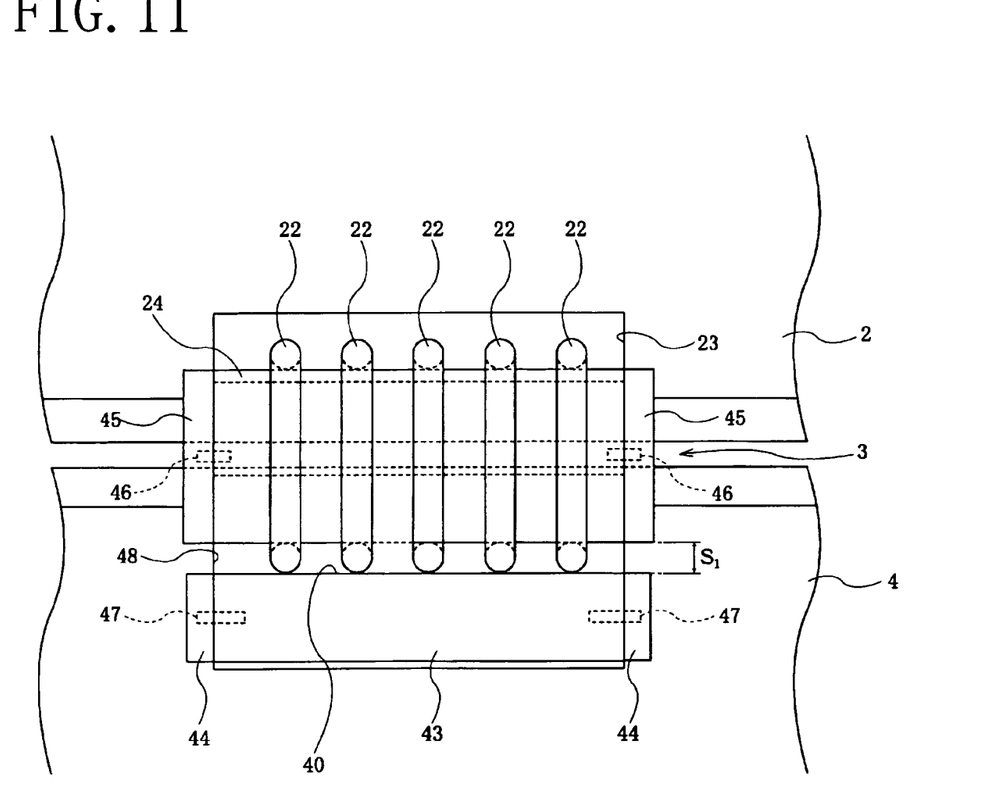
FIG. 11 is an enlarged front view showing the hinge mechanism and the guide member.

As shown in FIG. 11, the guide member 43 is attached to the pair of circular piece parts 44, 44 with a space $S_1$ slightly smaller than a diameter of the coaxial cables 22 described below provided between the guide surface 40 of the guide member 43 and the outer peripheral surface of the shaft member 24.

Figure 7:
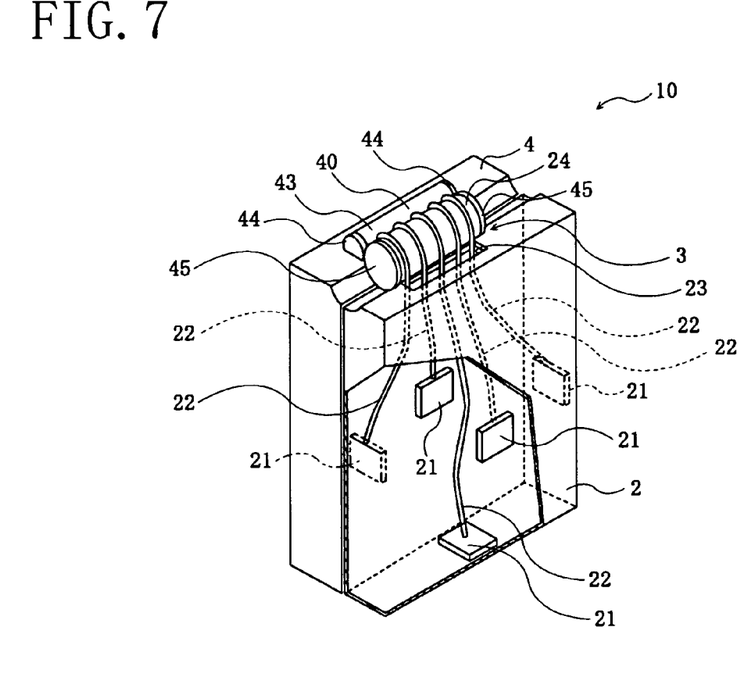
FIG. 7 is a partially broken perspective view showing an internal construction of an upper cabinet of an antenna unit in a second antenna device of the present invention.

As shown in FIG. 7, inside the upper cabinet 2, five flat antennas 21 with different reception characteristics and directivities are attached to five surfaces except a bottom surface. The coaxial cables 22 with excellent high-frequency characteristics are connected to the respective antennas 21. Ends of the five coaxial cables 22 pass through the slit 23 of the upper cabinet 2 and are drawn out of the upper cabinet 2 to pass through the hinge mechanism 3 and the opening 48 of the lower cabinet 4 and extend inside the lower cabinet 4.

The five coaxial cables 22 extending between the upper cabinet 2 and the lower cabinet 4 are wound around the outer peripheral surface of the shaft member 24 at mutually spaced intervals to pass between the outer peripheral surface of the shaft member 24 and the guide surface 40 of the guide member 43 as shown in FIG. 11. Here, since the space $S_1$ between the outer peripheral surface of the shaft member 24 and the guide surface 40 of the guide member 43 is slightly smaller than the diameter of the coaxial cables 22, the five coaxial cables 22 will be held between the outer peripheral surface of the shaft member 24 and the guide surface 40 of the guide member 43. Therefore, the five coaxial cables 22 will pass through the hinge mechanism 3 while keeping regular intervals and extend toward the lower cabinet 4.

Figure 8:
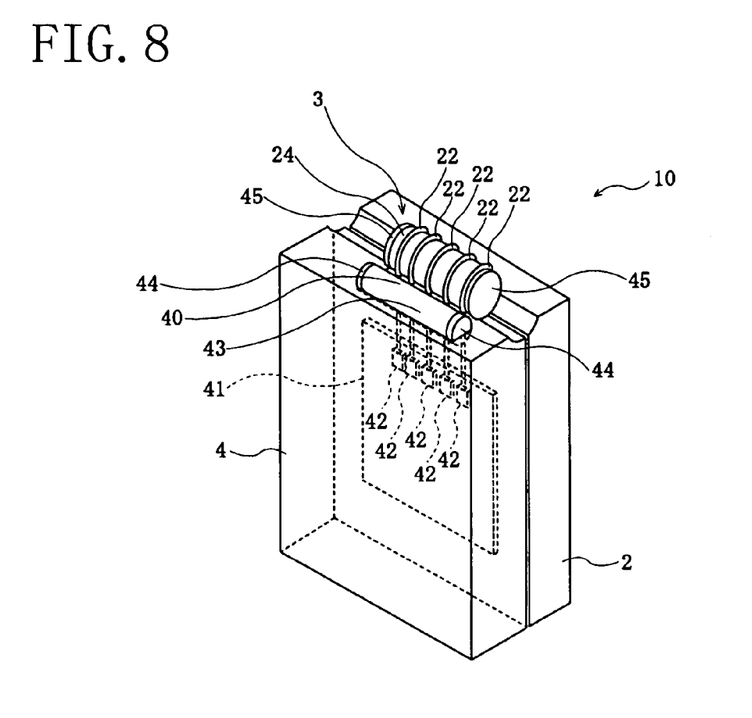
FIG. 8 is a perspective view showing an internal construction of a lower cabinet of the antenna unit.

As shown in FIG. 8, a radio module 41 is disposed inside the lower cabinet 4, and five terminal areas 42 are formed on an upper end of the radio module 41. Ends of the coaxial cables 22 are connected to the respective terminal areas 42. The five antennas 21 are thereby connected to the radio module 41 through the five coaxial cables 22.

In the above-described antenna device of the present example, when television broadcast waves are received from the television broadcast receiving device, the upper cabinet 2 is opened as shown in FIG. 1. The upper cabinet 2 is thereby projected from the upper surface of the main body 1 of the television receiver to arrange the five antennas 21 shown in FIG. 7 at a higher position than the upper surface of the main body 1. In this state, one or more of the antennas 21 in good communication conditions are selected from the five antennas 21 by the radio module 41, and television broadcast waves from the television broadcast receiving device are received by the antennas 21. Consequently, the display 11 of the television receiver displays high-quality video, while the pair of speakers 12, 12 emit high-quality audio.

After television broadcast waves finish being received, the upper cabinet 2 is closed as shown in FIG. 2, and the upper cabinet 2 is contained behind the main body 1 of the television receiver. The upper cabinet 2 of the antenna unit 10 is thereby hidden in a position invisible from front to prevent the antenna unit 10 from becoming obstructive.

In the above-described antenna device of the present example, the five coaxial cables 22 are held at mutually spaced intervals between the outer peripheral surface of the shaft member 24 of the upper cabinet 2 and the guide surface 40 of the guide member 43 of the lower cabinet 4, and the holding state is kept also at the time of opening and closing operation of the both cabinets 2, 4. That is, the upper cabinet 2 can be opened and closed relative to the lower cabinet 4 with each of the coaxial cables 22 held by the outer peripheral surface of the shaft member 24 and the guide surface 40. Therefore, the coaxial cables 22 do not shift in a rotation axis direction of the hinge mechanism 3 with opening and closing operation of the both cabinets 2, 4, maintaining a spaced apart position relationship to each other. Therefore, the five coaxial cables 22 are not entangled with each other with opening and closing operation of the both cabinets 2, 4.

The five coaxial cables 22 will circumferentially slightly slide on the outer peripheral surface of the shaft member 24 with opening and closing operation of the both cabinets 2, 4. Since the guide surface 40 for holding the coaxial cables 22 is defined by the outer peripheral surface of the rotatable guide member 43, the guide member 43 will rotate as the coaxial cables 22 slide to prevent friction from occurring between the coaxial cables 22 and the guide surface 40. Therefore, the five coaxial cables 22 smoothly slide on the outer peripheral surface of the shaft member 24 with opening and closing operation of the both cabinets 2, 4, so that the coaxial cables 22 do not prevent opening and closing operation of the both cabinets 2, 4.

According to the antenna device of the present example, the five coaxial cables 22 are always kept mutually spaced irrespective of the open or closed state of the both cabinets 2, 4, maintaining a spaced apart position relationship to each other also at the time of opening and closing operation of the both cabinets 2, 4. Therefore, the five coaxial cables 22 are not entangled with each other as the both cabinets 2, 4 are opened or closed, and therefore the five coaxial cables 22 are unlikely to cause troubles in opening and closing operation of the both cabinets 2, 4.

SECOND EXAMPLE

Figure 12:
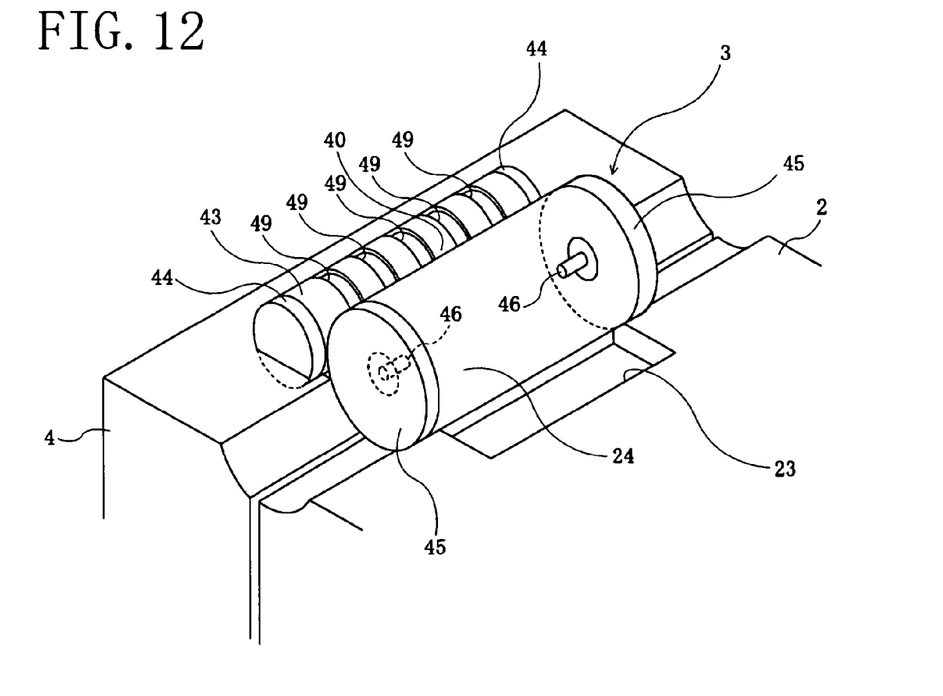
FIG. 12 is an enlarged perspective view showing a hinge mechanism and a guide member of an antenna device in a second example of the second antenna device of the present invention.
Figure 13:
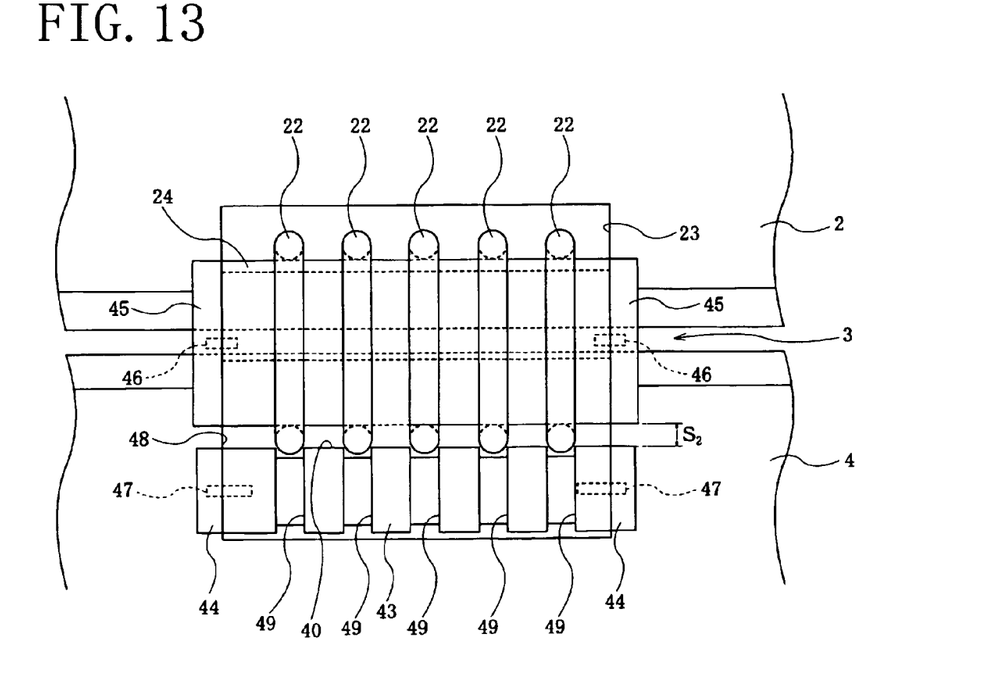
FIG. 13 is an enlarged front view showing the hinge mechanism and the guide member of the antenna device.

An antenna device of the present example shown in FIG. 12 and FIG. 13 has the same construction as in the above-described first example in that five coaxial cables 22 are held between an outer peripheral surface of a shaft member 24 projecting from an upper cabinet 2 and a guide surface 40 of a guide member 43 attached to a lower cabinet 4 when passing through a hinge mechanism 3 connecting the both cabinets 2, 4. However, as shown in FIG. 12, five circumferentially extending groove portions 49 are provided at axially spaced intervals on the guide surface 40 of the guide member 43.

As shown in FIG. 13, the guide member 43 is rotatably attached to a pair of circular piece parts 44, 44 with a space $S_2$ smaller than a diameter of the coaxial cables 22 provided between the guide surface 40 of the guide member 43 and the outer peripheral surface of the shaft member 24.

The five coaxial cables 22 exposed from the upper cabinet 2 are held between the guide surface 40 of the guide member 43 and the outer peripheral surface of the shaft member 24 while being fitted in the groove portions 49 of the guide surface 40, and the coaxial cables 22 are thereby tidily arranged on the guide surface 40 at mutually spaced regular intervals. The coaxial cables 22 then pass between the guide surface 40 of the guide member 43 and the outer peripheral surface of the shaft member 24 while keeping the mutually spaced regular intervals and extend toward the lower cabinet 4.

In the antenna device of the present example, the five coaxial cables 22 are held between the guide surface 40 of the guide member 43 and the outer peripheral surface of the shaft member 24 while being fitted in the groove portions 49 of the guide surface 40. In addition, the space $S_2$ between the guide surface 40 and the shaft member 24 is smaller than the diameter of the coaxial cables 22. Therefore, the coaxial cables 22 will be restrained inside the groove portions 49. Therefore, the five coaxial cables 22 do not escape from the groove portions 49 with opening and closing operation of the both cabinets 2, 4, and are not entangled with each other.

THIRD EXAMPLE

Figure 14:
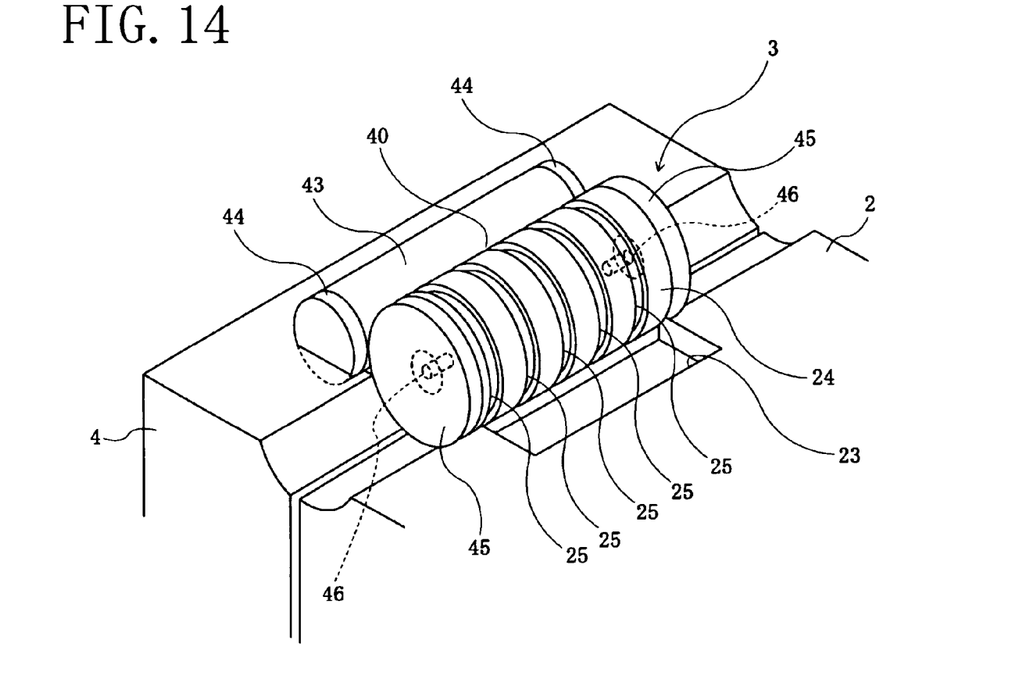
FIG. 14 is an enlarged perspective view showing a hinge mechanism and a guide member of an antenna device in a third example.
Figure 15:
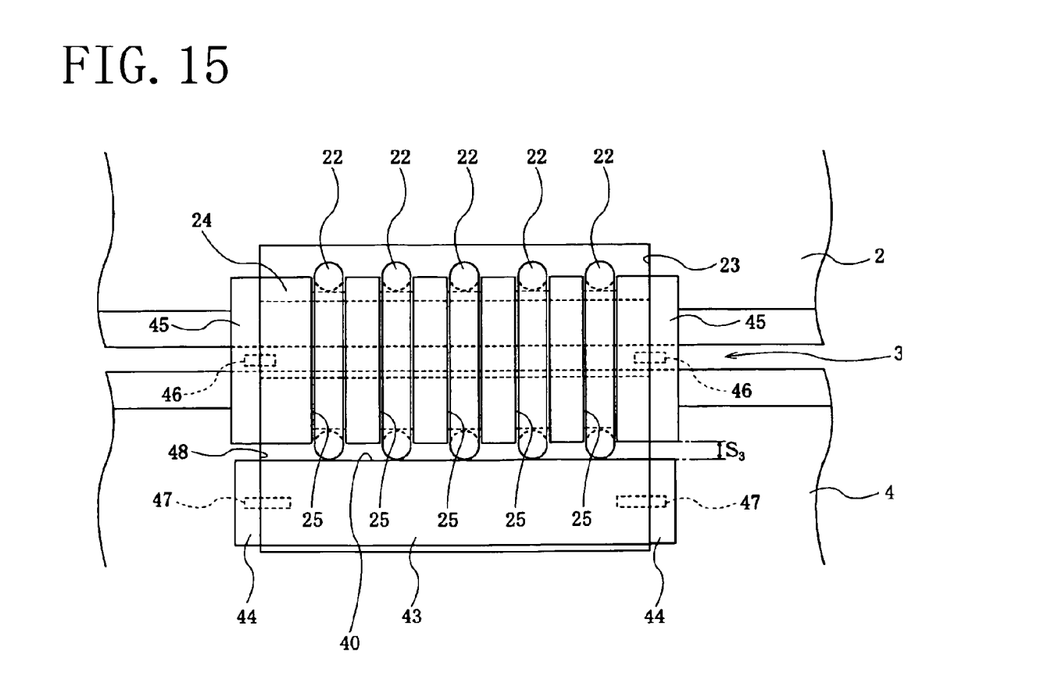
FIG. 15 is an enlarged front view showing the hinge mechanism and the guide member of the antenna device.

An antenna device of the present example shown in FIG. 14 and FIG. 15 has the same construction as in the above-described first example in that five coaxial cables 22 are held between an outer peripheral surface of a shaft member 24 projecting from an upper cabinet 2 and a guide surface 40 of a guide member 43 attached to a lower cabinet 4 when passing through a hinge mechanism 3 connecting the both cabinets 2, 4. However, as shown in FIG. 14, five circumferentially extending winding grooves 25 are provided at axially spaced intervals on the outer peripheral surface of the shaft member 24.

As shown in FIG. 15, the guide member 43 is rotatably attached to a pair of circular piece parts 44, 44 with a space $S_3$ smaller than a diameter of the coaxial cables 22 provided between the guide surface 40 of the guide member 43 and the outer peripheral surface of the shaft member 24.

The five coaxial cables 22 exposed from the upper cabinet 2 are held between the guide surface 40 of the guide member 43 and the outer peripheral surface of the shaft member 24 while being fitted in the winding grooves 25 of the shaft member 24, and the coaxial cables 22 are thereby tidily arranged on the outer peripheral surface of the shaft member 24 at mutually spaced regular intervals. The coaxial cables 22 then pass between the guide surface 40 of the guide member 43 and the outer peripheral surface of the shaft member 24 while keeping the regular intervals and extend toward the lower cabinet 4.

In the antenna device of the present example, the five coaxial cables 22 are held between the guide surface 40 of the guide member 43 and the outer peripheral surface of the shaft member 24 while being fitted in the winding grooves 25 of the shaft member 24. In addition, the space $S_3$ between the guide surface 40 and the shaft member 24 is smaller than the diameter of the coaxial cables 22. Therefore, the coaxial cables 22 will be restrained inside the winding grooves 25. Therefore, the five coaxial cables 22 do not escape from the groove portions 49 with opening and closing operation of the both cabinets 2, 4, and are not entangled with each other.

The present invention is not limited to the foregoing embodiments in construction but can be modified variously within the technical scope set forth in the claims. For example, in the first antenna device, the same effect as in the foregoing example can be obtained by a construction in which the radio module 41 is incorporated in the main body 1 of the television receiver, and the upper cabinet 2 is openably and closably connected to the main body 1.

Figure 16:
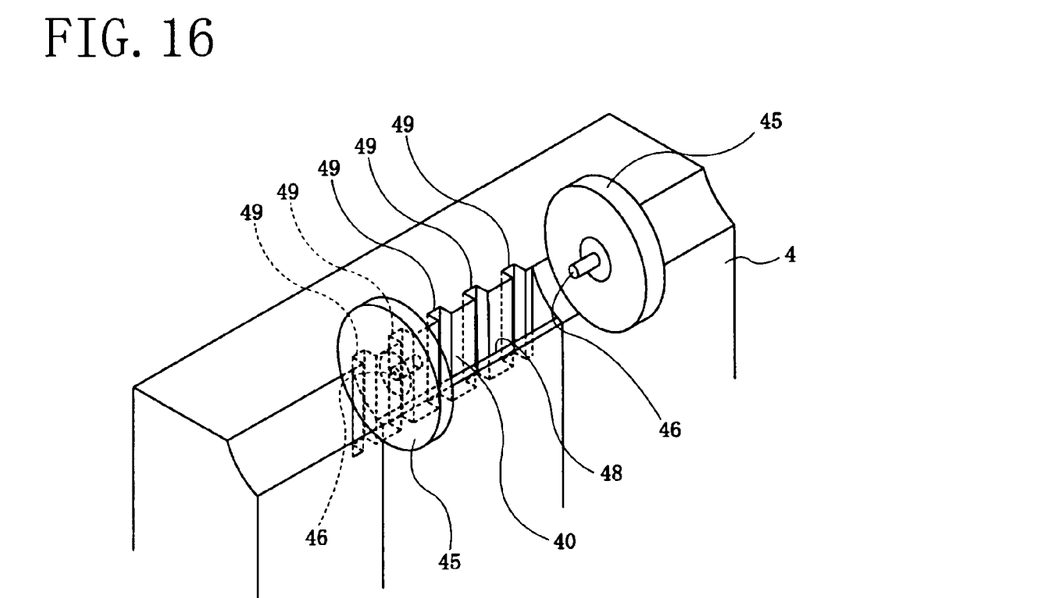
FIG. 16 is an enlarged perspective view showing a guide surface of another antenna device of the present invention.
Figure 17:
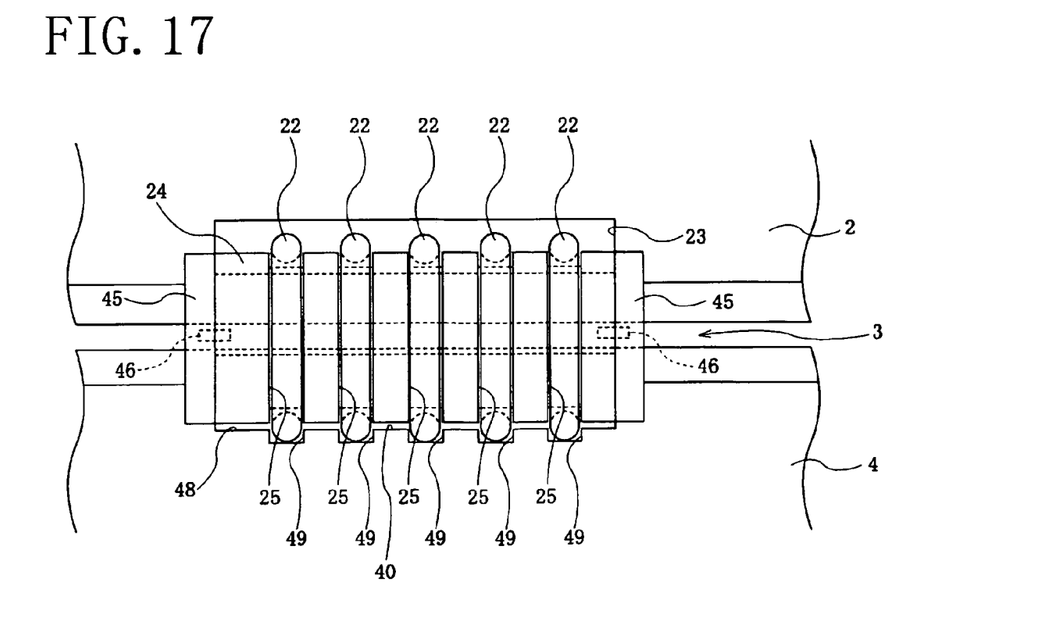
FIG. 17 is an enlarged front view showing a hinge mechanism and the guide surface of the antenna device.

In the second antenna device, the same effect as in the foregoing examples can also be obtained by a construction in which as shown in FIG. 16 and FIG. 17, the guide surface 40 is defined on an inner surface of the opening 48 of the lower cabinet 4, while the five groove portions 49 are provided on the guide surface 40 at intervals, and the coaxial cables 22 are held between the guide surface 40 and the outer peripheral surface of the shaft member 24 with the coaxial cables 22 fitted in the groove portions 49.

The same effect as in the foregoing examples can also be obtained by a construction in which the radio module 41 is incorporated in the main body 1 of the television receiver, and the upper cabinet 2 is openably and closably connected to the main body 1. Furthermore, if the guide member 43 is formed by elastic resin, the coaxial cables 22 can be held without being damaged.

The invention claimed is:

1. A collapsible antenna device comprising a plurality of antennas connected to a radio module through respective cables, the radio module being capable of selecting one or more of the antennas in good communication conditions, wherein a movable case is pivotally supported on a base case through a hinge mechanism, and the radio module is contained in the base case, while the plurality of antennas are disposed in the movable case, the hinge mechanism comprising a cylindrical shaft member openably and closably connecting the base case and the movable case to each other, an outer peripheral surface of the shaft member having a plurality of circumferentially extending groove portions provided at axially spaced intervals, the plurality of cables extending between the plurality of antennas and the radio module being wound around the outer peripheral surface of the shaft member while being respectively fitted in the plurality of groove portions of the shaft member.

2. The collapsible antenna device according to claim 1, wherein a single spirally extending groove is provided on the outer peripheral surface of the shaft member, the groove defining the plurality of groove portions, and each of the cables is wound around the groove over an angle range of 360 degrees or more.

3. The collapsible antenna device according to claim 1 or 2, wherein the plurality of groove portions represent V-shapes in a cross section including a central axis of the shaft member.

4. A collapsible antenna device comprising a plurality of antennas connected to a radio module through respective cables, the radio module being capable of selecting one or more of the antennas in good communication conditions, wherein a movable case is pivotally supported on a base case through a hinge mechanism, and the radio module is contained in the base case, while the plurality of antennas are disposed in the movable case, the hinge mechanism comprising a cylindrical shaft member openably and closably connecting the base case and the movable case to each other, the base case having disposed thereon a guide surface opposed to an outer peripheral surface of the shaft member, the plurality of cables extending between the plurality of antennas and the radio module being held at mutually spaced intervals between the outer peripheral surface of the shaft member and the guide surface.

5. The collapsible antenna device according to claim 4, wherein the base case has rotatably disposed thereon a cylindrical guide member extending in parallel with the shaft member, and the guide surface is defined by an outer peripheral surface of the guide member.

6. The collapsible antenna device according to claim 4 or 5, wherein the guide surface is provided with a plurality of groove portions extending along the plurality of cables, and the plurality of cables are respectively fitted in the plurality of groove portions.

7. The collapsible antenna device according to claim 6, wherein the outer peripheral surface of the shaft member has a plurality of circumferentially extending winding grooves provided at axially spaced intervals, and the plurality of cables are respectively fitted in the plurality of winding grooves.

8. The collapsible antenna device according to claim 4 or 5, wherein the outer peripheral surface of the shaft member has a plurality of circumferentially extending winding grooves provided at axially spaced intervals, and the plurality of cables are respectively fitted in the plurality of winding grooves.

* * * * *